United States Patent [19]

Leong

[11] 4,161,159
[45] Jul. 17, 1979

[54] INSTANTANEOUSLY EMPTIABLE EXTERNALLY MOUNTED ANIMAL FOOD TRAY

[75] Inventor: Basil K. J. Leong, Portage, Mich.

[73] Assignee: International Research and Development Corp., Mattawan, Mich.

[21] Appl. No.: 812,639

[22] Filed: Jul. 5, 1977

[51] Int. Cl.² .............................................. A01K 1/02
[52] U.S. Cl. ................................................... 119/18
[58] Field of Search ........................................ 119/18

[56] References Cited

U.S. PATENT DOCUMENTS

| 1,854,311 | 4/1932 | Pavelec et al. | 119/18 X |
| 2,828,717 | 4/1958 | Mikkelsen | 119/18 X |
| 2,863,418 | 12/1958 | Pockman | 119/18 |
| 3,208,430 | 9/1965 | Ernst | 119/18 |
| 4,036,177 | 7/1977 | DeSmit | 119/18 |

Primary Examiner—Louis G. Mancene
Assistant Examiner—Daniel J. Leach
Attorney, Agent, or Firm—Gordon W. Hueschen

[57] ABSTRACT

Novel instantaneously emptiable animal food tray, particularly adapted to be mounted externally of but between two juxtaposed and longitudinally facing animal cages, is disclosed. The tray comprises a bottom which is angled downwardly from a central longitudinal apex to its side edges, vertically extending members at the ends of the tray, and handle means for manipulating the tray into and out of the space between the juxtaposed cages.

14 Claims, 8 Drawing Figures

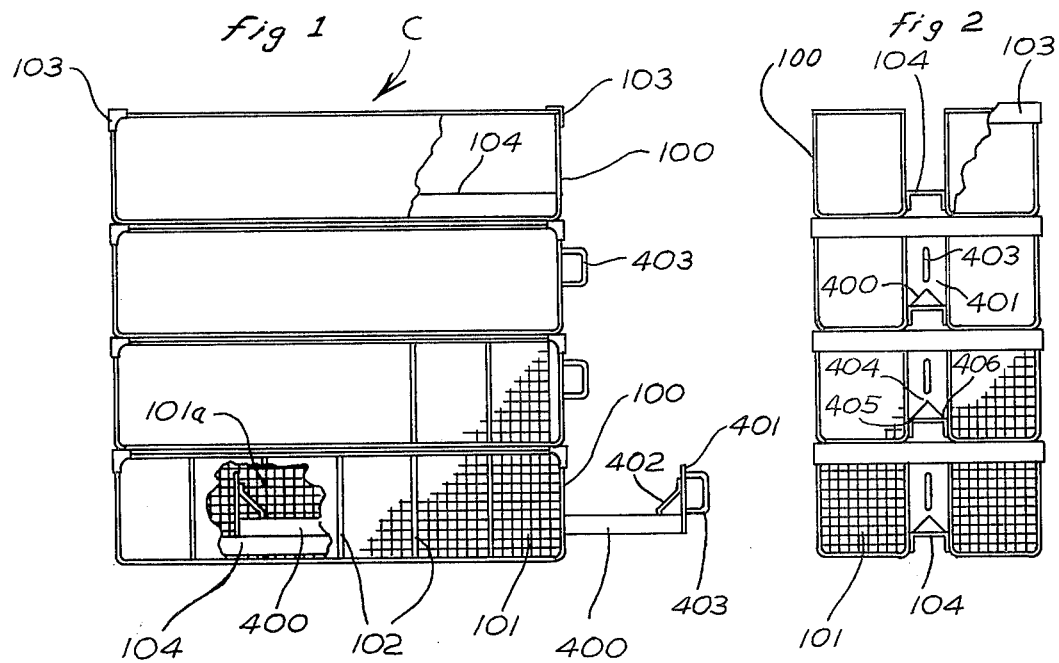
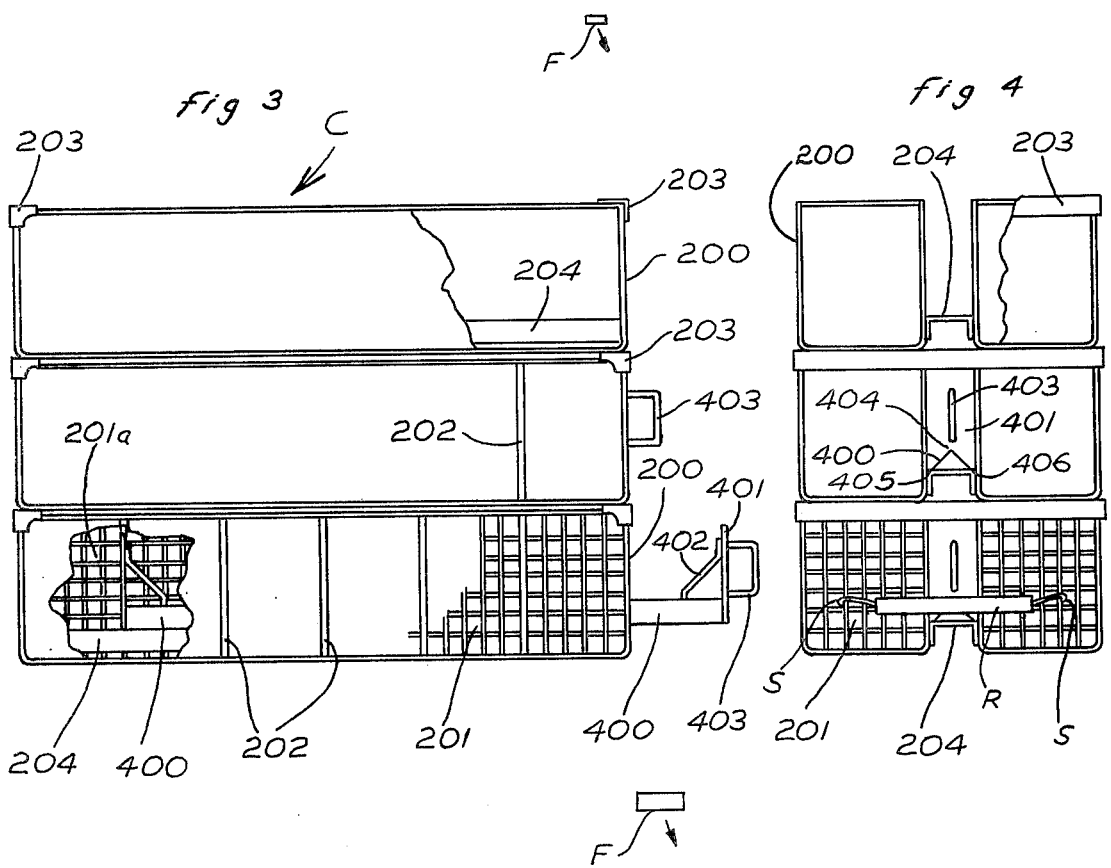

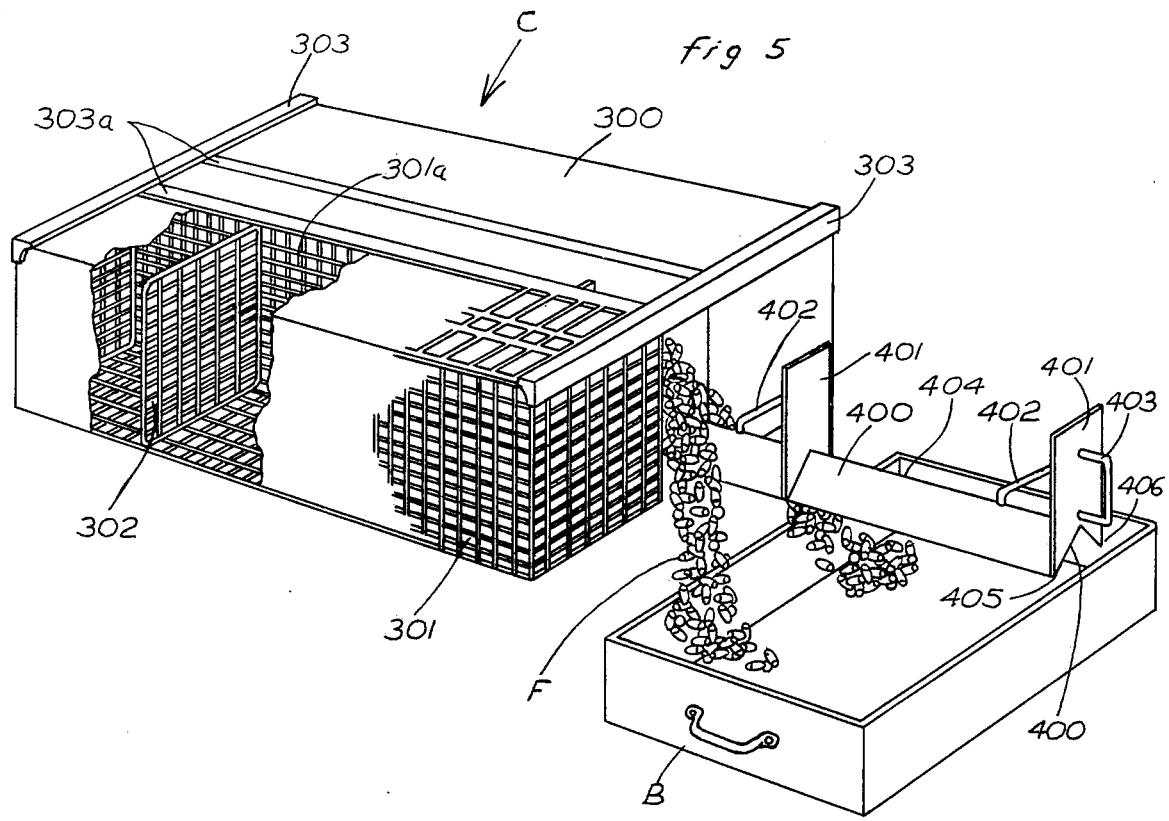
fig 5
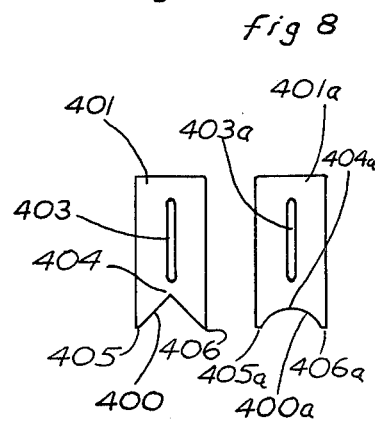
fig 6
fig 7
fig 8

INSTANTANEOUSLY EMPTIABLE EXTERNALLY MOUNTED ANIMAL FOOD TRAY

BACKGROUND OF INVENTION (1) Field of Invention

Animal food trays, particularly adapted for use in conjunction with animal cages, and combinations therewith, especially such animal food trays which are mounted externally of the animal cages and which are instantaneously emptiable.

(2) Prior Art

The testing of various materials for their effects in animals, such as toxicity or the like, is now an established part of our agricultural, pharmaceutical, and environmental picture. Never before has animal testing played such an important part in our civilization. Tests of innumerable types are performed on various species of animals for purposes of determining acute and chronic toxicity, pharmacodynamic activity, antimicrobial activity, antimalignancy activity, teratogenic effect, and for many other purposes too numerous to mention, by many different routes and according to many different test procedures. For this reason, it is necessary to maintain viable animals in cages for shorter or longer periods, as the particular test procedure may require, and to maintain them in healthy condition so that the desired effect upon them can be accurately measured and to avoid undesirable death in a particular colony which would interfere with statistical evaluation of results. To this end, various approaches have been taken to the problem of feeding the caged animals, most of which have involved the attachment of food trays or food containers of one sort or another to the outside of the cage, through which the animals could have access to the food ad libitum, and in most cases these food trays or other containers or dispensers have been hung externally of the individual cage with clamps or extensions protruding from the tray or other container and adapted to engage the mesh of the cage for purposes of maintaining the food container in contact with or in close proximity to the cage to enable access thereto by the animal or animals within the cage. This approach replaced the older approach of placing the food directly into the cage, with its numerous obvious disadvantages. With the development of multiple caging, that is, a plurality of cage units within a single cage, the individual cage units being maintained by means of any of solid or perforated or mesh dividers, some of these food containers became elongated to serve a plurality of the individual cage units simultaneously. The feeding and the food container problem became more complex and involved with the origination of side-by-side caging, that is, cages maintained in side-by-side juxtaposition with respect to each other, and became an even greater concern with the advent of bank caging, in which a plurality of multiple cage units are stacked in banks upon each other, either directly or by means of intervening racks or trays and cooperating vertical support means. In such banks of multiple cage units, it is still not uncommon to see a dozen or so externally mounted food trays per multiple cage unit, attached by means of hooks or the like to the screen of the cage, so that a bank of multiple cages comprising twenty-four twelve-cage units, or two hundred eighty-eight individual compartments, may have up to two hundred eighty-eight individual feeding trays, one per each compartment, or, as is now perhaps more common, forty-eight elongated food trays, each serving up to twelve individual compartments of the cage, and hanging by hooks or the like in the mesh of the cage units at the sides thereof. The problems of keeping the food trays filled with food when desired are substantial, as is well understood by one skilled in the art.

An even greater problem, however, is encountered when it is desired to move an animal cage or a group of animal cages, say two hundred eighty-eight individual compartments, into a test condition or position in which further food intake is not desired, for example, during an inhalation toxicity test, during which entire banks of cages, with animals therein, are placed into a sealed chamber for the testing of materials by inhalation and during which test period no further food intake by the animals is permitted. Other test procedures which require cessation of food intake exist and are known to one skilled in this art. At such time, as will be recognized, it becomes necessary to remove all of the food trays from their position attached to the animal cages, empty them of food, and replace them on the cages, or, alternatively, to store them in some storage place, if available, either with food intact therein, which gives rise to considerable spillage and loss of the food, or after emptying them, which of course requires facilities for storing both food and the trays after having been emptied. The problems involved in such a procedure are apparent, and are even more obvious to one skilled in the art who has found it necessary to carry out such procedure, which of course is extremely time-consuming and uneconomical. It is apparent that a superior food tray for use in combination with animal cages, and particularly one which is readily emptiable upon demand, would serve a great and crying need in this particular art of animal caging, feeding, and testing.

SUMMARY OF THE INVENTION

It is accordingly an object of the present invention to provide such a superior animal food tray. It is another object of the invention to provide such an improved animal food tray which is externally mounted with respect to the cages served by it and which is instantaneously emptiable upon demand. A further object is the provision of such a tray which has a bottom slanted from an apex to the lower edges thereof to permit bulk or bar food placed thereon to contact by gravity the wire mesh walls of animal cages between which it is located. A still further object is the provision of such an animal food tray which is particularly adapted to be mounted between adjacent animal cages which are located in spaced relationship from each other so as to provide an opening longitudinally therebetween for the insertion and removal of such a food tray. Still another object of the invention is the provision of such a food tray in combination with such side-by-side animal cages wherein mounting means for slidable engagement with the edges of the bottom of said tray is provided between the said adjacent or juxtaposed animal cages for ready insertion or removal of the animal tray from its position between the adjacent animal cages. Still an additional object of the invention is the provision of such a combination wherein the mesh of the cages at least on the sides of the cages facing on the opening between adjacent cages is of such a size as to permit access, by the animals in the adjacent cage compartments, to the food between the cages on the animal food tray, but of such dimensions as to prohibit the entry of food segments, of selected size according to the animals being fed, through the mesh of the screen and into the animal cages proper. Yet another object of the invention is the provision of such an instantaneously emptiable animal food tray having a bottom in the shape of an inverted V or a partial arc, in either case extending downwardly toward its lower edges, and yet a further object of the invention is the provision of such an animal food tray having upright members substantially conforming to the cross-sectional area of the space between the adjacent cages in which the food tray is located or to be located, to assist rapid emptying of the food tray by simple pulling of the tray outwardly from within the recess between the adjacent cages. Yet an additional object of the invention is the provision of such a combination wherein the space between adjacent juxtaposed animal cages is left open at its top to facilitate rapid introduction of animal feed thereinto with the tray in place in said opening between the said adjacent cages. The accomplishment of the foregoing and additional objects will appear more fully hereinafter, and still other objects will be apparent to one skilled in the art to which this invention appertains as the description proceeds.

DESCRIPTION OF THE PREFERRED EMBODIMENTS

The invention, in preferred embodiments, is illustrated by the accompanying drawings, in which:

FIG. 1 is a side view, partially cut away, showing a four-tier bank of animal cages and, partially, the animal food tray of the present invention.

FIG. 2 is an end view, partially cut away, of a four-tier bank of animal cages arranged in side-by-side juxtaposition with the animal feed tray of the present invention located therebetween. FIG. 2 shows the same bank of animal cages as does FIG. 1.

FIGS. 3 and 4 show a three-tier bank of animal cages, arranged in side-by-side juxtaposition, and adapted to contain larger animals, with the animal feed tray of the invention located between the side-by-side juxtaposed animal cages. FIG. 3 shows a partially cut away side view and FIG. 4 shows a partially cut away end view of a slightly different embodiment.

FIG. 5 shows a partially cut away perspective view of another multiple-compartment animal cage, arranged in juxtaposition to a second unit of the same type, with the animal feed tray of the invention located therebetween and illustrated in the process of being withdrawn for purposes of instantaneous emptying of the animal feed tray.

FIG. 6 is a side elevation of the animal feed tray of the invention.

FIG. 7 is a front view of the animal feed tray of the invention, and,

FIG. 8 is a front view of another embodiment of the animal feed tray of the present invention.

SPECIFIC REFERENCE TO THE DRAWINGS

Reference is now made to the accompanying drawings for a better understanding of the invention, wherein all of the parts are numbered and wherein the same numbers are used to refer to the animal feed tray of the present invention throughout, corresponding parts otherwise being numbered in the one hundred (100) series in FIGS. 1 and 2, in the two hundred (200) series in FIGS. 3 and 4, and in the three hundred (300) series in FIG. 5.

According to a preferred form of the invention, a bank of animal cages is shown generally in FIGS. 1, 3 and 5 at C. In FIGS. 1 and 2, the cages have a small mesh, illustratively a U.S. mesh size No. 2, for purposes of holding nibbling animals such as mice. A mouse cage, due to its mesh size, will hold or retain any food cube which is larger than approximately 0.3 inch on its largest diameter. In FIGS. 3 and 4, it will be noted that the mesh size is larger. This is illustratively mesh size no. 3 and the cages are illustratively adapted to contain gnawing animals such as rats, rabbits, guinea pigs, hamsters, or the like. A cage having a U.S. mesh size no. 3 screen will hold or retain any food cube which is larger than 1.5 inches on its largest diameter, the figure being approximate.

In FIGS. 1 and 2, a four-tier bank of cages is shown, the cages being arranged in tiers or layers of two, each layer or tier comprising two longitudinally juxtaposed animal cages in spaced relationship with a channel or opening therebetween.

Referring now to FIGS. 1 and 2, the multiple cage units are there illustrated at 100, the juxtaposed layers or tiers of two being stacked upon each other and the longitudinally juxtaposed animal cages being held in fixed spaced relationship to each other by end brackets 103 secured to both of the juxtaposed multiple cage units at their upper front and rear edges. As shown, these juxtaposed multiple cage units are also held in spaced relationship by inverted "U" brackets 104, upon which the bottom 400 of the instantaneously emptiable animal feed tray of the present invention rides. Although shown in the drawing as an inverted "U" connecting the two juxtaposed animal cages, this spacer constituting a track upon which the bottom 400 of the feed tray may slide can take other forms and need not be in the form of an inverted "U" bracket. Neither must it be secured to the two juxtaposed animal cages. It may, for example, take the form of two "V" brackets, one on each of the adjacent animal cages, or it may in some cases even be absent, the feed tray of the invention then slidably engaging the top of the next lower tier of cages or the surface of a supporting tray or sheet upon which the adjacent cages may rest, although the presence of an inverted "U" bracket, two "V" brackets, or other brackets constituting a slide with which the feed tray of the invention may slidably engage, certainly constitutes a preferred embodiment of the invention. As shown, sheetform vertical members 401 are present as an essential part of the animal tray of the invention, and these are stabilized by struts or support members 402. A handle 403 is secured to the outer end plate 401 of the feed tray, for ready withdrawal of the feed tray when it is desired to empty the same. Also, as shown, the cages comprise the usual screen walls 101, dividers 102, and, in the lower portion of FIG. 1, the animal tray of the present invention is shown in partially withdrawn position, with the screen on the other side of the multi-compartment cage unit being visible in the cutaway section, together with the rear end of the animal feed tray which is being withdrawn. Bar animal food F, as seen in FIG. 1, having dimensions so as not to pass through the screen having the mesh size of 101 in FIGS. 1 and 2, is shown floating away below the animal feed tray in its partially withdrawn position.

Referring now to FIGS. 3 and 4, the same elements and members are visible, with the mesh size of the screen 201 and the individual particle of animal food F having somewhat larger dimensions, the cages being suitable for containment of larger animals. Three tiers or layers of cages are shown, and each layer comprises two animal cages in side-by-side or longitudinal juxtaposition, again secured together at their upper front and rear edges by brackets 203 and having a spacer bracket 204 therebetween and secured to both of the juxtaposed animal cages, thereby constituting a track upon which the edges 405, 406 of the bottom 400 of the animal feed tray of the invention can ride.

Referring now to FIG. 5, only one single tier comprising two multi-compartment cages arranged in side-by-side juxtaposition is here depicted. The walls of the cages comprise screen 301 of suitable mesh size and the multi-unit cages include individual compartment dividers 302. The screen on the side of the animal cage fronting the space between the juxtaposed cage units is shown at 301a. Brackets 303 at the upper front and rear edges of the cages support the two units in juxtaposition in their side-by-side relationship, and further brackets or edge bars 303 located at the adjacent top edges of the cages provide strengthening support in the usual manner to the individual cages and to the juxtaposed unit of two cages.

As the feed tray of the invention is withdrawn from the recess or space between the two juxtaposed animal cages, it rides upon the inverted "U" bracket (not shown) within the space between the two multi-cage units comprising the dual unit 300. The bottom 400 of the animal feed tray is in the form of an inverted "V", as shown, and its lower edges 405, 406 slidably engage the bracket internally of the recess between the two multi-cage units. The vertical sheetform members 401, to the front one of which is secured handle 403, substantially fill the space between the cage units immediately above the bottom 400 of the animal feed tray, and are secured to the said bottom for stabilization purposes by struts or support members 402. Upon withdrawal of the feed tray of the invention from the recess between the two multi-cage units, as shown, the food which reposes within the space between the two multi-compartment cage units is urged outwardly by the vertical sheet-form members or plates 401, falls outwardly from apex 404 due to the inverted "V" contour of the tray, and may be collected in bin B or other suitable receptacle for use at a later date. The tray may then be returned to the recess between the juxtaposed multi-compartment cage units but, as will be apparent from FIG. 5, a simple quick withdrawal of the tray from its location between the juxtaposed multi-compartment cage units effectively withdraws all of the animal food and empties the tray in a most rapid, efficient, and unprecedented manner. There is no need to store the tray, because it is stored in its normal position between the adjacent cage units. Only the animal food need be stored for reuse, as previously indicated.

FIG. 6 shows a side elevation of the animal feed tray of the invention, as already described, including a bottom 400 having an apex 404 and angling outwardly and downwardly toward its lower edges 405, 406, vertical or upright sheetform members or plates 401, supporting members or struts 402, and handle 403. In FIG. 6 the tray is generally shown at T whereas, in FIG. 7, the forward end of the tray is depicted with front end plate 401, bottom 400, and handle 403 being apparent. In FIG. 8 an alternative version is depicted, having the same elements 401a, 400a, and 403a, the bottom in this case also having an apex 404a and being angled downwardly and outwardly to lower edges 405a, 405b of tray bottom 400a, but in this case being in the form of an arc, thereby to attain the same effect as attained with the inverted "V" or other similar configurations, namely, an outward spilling of the animal feed contained thereon upon withdrawal of the food tray from its normal space between the side-by-side or longitudinally juxtaposed cage units.

As will be apparent from FIG. 5, the space between longitudinal brackets 303a is preferably left uncovered to facilitate the rapid insertion of animal feed into the space between adjoining cage units and upon the upper surface of the tray, especially tray bottom 400, which obviously could be solid instead of angled or arced sheetform material as illustrated.

In operation, the side-by-side juxtaposed animal cages as shown in FIG. 5, or in banks, tiers, or layers as shown in FIGS. 1-4, or mounted in usual manner on racks or trays, either before or after filling with animals in the normal manner, have the unique animal feed tray of the present invention placed therebetween, perferably in slidable relationship with brackets connecting the two juxtaposed animal cages at the lower portion thereof. This provides support means for the inward and outward movement of the lower edges of the bottom 400 of the animal feed tray of the invention. In this position, the feed tray is pushed all the way in, as shown in the second and third tiers of FIG. 1 and for the second tier in FIG. 3. While in this position, the block animal food is conveniently loaded into the space between the juxtaposed animal cages and onto the animal feed tray of the invention. In this position, the animals have access to the animal feed, which is dimensioned so as not to pass through the mesh constituting the walls of the animal cage, at least the walls constituting the opposed or facing walls of the two side-by-side animal cages. Although loading is most readily accomplished when the cages are spaced vertically from each other, as is usual when separating trays or racks are employed for supporting the cages, it can also be done conveniently when the cages are stacked upon each other or before stacking.

When it is desired to replace the animal food with new animal food, or merely to empty the tray so that the animals can be subjected to an inhalation toxicity test or the like, the handle 403 is grasped and the tray given a firm outward pull, thereby pulling along therewith all of the bar animal food retained thereby in the constricted space between the adjacent animal cages. As the tray passes out from the opening between the juxtaposed animal cages, the bar food falls off of the angled bottom of the tray and may be conveniently collected in another receptacle for disposal or reuse. When the simple, effective, and rapid emptying procedure is completed, the tray is simply pushed back into the recess between the juxtaposed animal cages for storage in an unfilled or empty condition until once again it is desired to provide food to animals within the cages, whereupon the cycle is merely repeated.

As a still further optional but preferred feature, as shown in FIG. 4, restraining means R such as a strap attached to the front walls of adjacent cages, as by means of spring clips or snaps S,S, may be present for holding in the front end plate 401 and to restrain undesired, accidental, or inadvertent removal or outward travel of the tray T from the recess between adjacent cages, for example, during moving of a rack containing the said cages or a bank thereof, thereby to prevent inadvertent spillage of food contents from the tray.

I claim:

1. A readily emptiable animal food tray, for use in conjunction with a plurality of animal cages mounted side-by-side and having support means of approximately the same width as said food tray therebetween, whereby said animal cages are spaced from each other approximately the width of said animal food tray thereby forming a recess therebetween, comprising a bottom, vertically extending members at the ends of said tray which are adapted substantially to correspond to the cross-section of the recess between said adjacent animal cages immediately above said tray bottom, and gripping means on the vertically extending member at one end of said tray for pushing or pulling said tray into and out of the said opening between adjacent animal cages, said bottom of said tray being angled downwardly from a central longitudinal apex to its lower edges.

2. The tray of claim 1, wherein said bottom is in the form of an inverted "V".

3. The tray of claim 1, wherein said bottom is in the form of an arc.

4. The tray of claim 1, wherein said vertically extending members are sheetform in nature and supported by support means attached to said members and to said bottom member.

5. The tray of claim 1, wherein said gripping means comprises a handle.

6. The combination comprising a plurality of animal cages in spaced side-by-side longitudinal relationship, with an opening of approximately the same width as a food tray to be contained therebetween forming a recess between them, said animal cages having screen walls fronting on said opening, support means located between said cages for supporting an externally mounted animal food tray in said opening between said cages, said tray comprising a bottom, vertically extending members at the ends of said tray which are adapted substantially to correspond to the cross-section of said recess between said adjacent animal cages immediately above said tray bottom, and gripping means on the vertically extending member at one end of said tray for pushing or pulling said tray into and out of said recess between adjacent animal cages, said bottom of said tray being angled downwardly from a central longitudinal apex to its lower edges, said lower edges of said tray slidably engaging said support means in said opening between said facing cages, whereby said animal food tray may be slidably removed from the opening between said facing cages for rapid emptying of said food tray.

7. The combination of claim 6, wherein said facing cages are in opposed facing relationship with said opening therebetween open at its top for ready placement of animal food upon said animal food tray when in place in said opening between said opposed facing cages.

8. The combination of claim 6, wherein said support means between said cages is in the form of an inverted "U" bracket.

9. The combination of claim 6, wherein said tray bottom is in the form of an inverted "V".

10. The combination of claim 6, wherein said tray bottom is in the form of an arc.

11. The combination of claim 6, wherein said vertically extending members are sheetform in nature and supported by support means attached to said members and to said bottom member.

12. The combination of claim 6, wherein said gripping means comprises a handle.

13. The combination of claim 6, wherein said screen walls are of a mesh size suitable to prevent animal food, of dimensions suitable for feeding of animals within said cages, from falling through said screen into said cages, but yet to permit animals within said cages to reach said animal food through said screen openings.

14. The combination of claim 6, including restraining means attached to the adjacent cages at the front walls thereof for holding in the front vertically extending member and thereby restraining outward travel of the tray.

* * * * *